United States Patent [19]

Landaeus

[11] Patent Number: 5,060,779
[45] Date of Patent: Oct. 29, 1991

[54] MOVING RAMP

[75] Inventor: Kjell Landaeus, Vence, France

[73] Assignee: Rollomatic AB, Malmo, Sweden

[21] Appl. No.: 488,065

[22] PCT Filed: Dec. 19, 1988

[86] PCT No.: PCT/SE88/00694

§ 371 Date: Jul. 24, 1990

§ 102(e) Date: Jul. 24, 1990

[87] PCT Pub. No.: WO89/05771

PCT Pub. Date: Jun. 29, 1989

[30] Foreign Application Priority Data

Dec. 18, 1987 [SE] Sweden ................... 8705051

[51] Int. Cl.⁵ ............................................ B66B 21/10
[52] U.S. Cl. ................................. 198/321; 198/798; 198/800
[58] Field of Search .............. 198/321, 800, 475.1, 198/795, 798, 792

[56] References Cited

U.S. PATENT DOCUMENTS

| | | |
|---|---|---|
| 900,000 | 9/1908 | Seeberger . |
| 1,385,584 | 7/1921 | Peleskey .................... 198/321 |
| 2,195,326 | 3/1940 | Crawford et al. .......... 198/800 X |
| 2,369,840 | 2/1945 | Nalbach et al. . |
| 2,390,455 | 12/1945 | Nalbach ...................... 198/798 |
| 2,414,164 | 1/1947 | Nalbach ...................... 198/798 |
| 2,493,857 | 1/1950 | Cargill ......................... 198/798 |
| 2,555,838 | 6/1951 | Abbott ......................... 198/798 |
| 2,893,538 | 7/1959 | Buttironi et al. ............ 198/798 X |
| 3,243,032 | 3/1966 | Chambon ..................... 198/798 X |
| 3,447,666 | 6/1969 | Nevo-Hacohen ............ 198/800 |
| 3,795,328 | 3/1974 | Buttironi ...................... 198/798 X |
| 4,067,437 | 1/1978 | Frantl et al. ................. 198/800 |
| 4,535,880 | 8/1985 | Boltrek . |

FOREIGN PATENT DOCUMENTS

| | | |
|---|---|---|
| 0138372 | 4/1985 | European Pat. Off. . |
| 1011810 | 7/1957 | Fed. Rep. of Germany ...... 198/800 |
| 1236280 | 9/1959 | France ........................... 198/321 |
| 1425277 | 4/1964 | France ........................... 198/321 |
| 365331 | 10/1962 | Switzerland . |

Primary Examiner—D. Glenn Dayoan
Attorney, Agent, or Firm—Merchant & Gould, Smith, Edell, Welter & Schmidt

[57] ABSTRACT

Moving ramp intended e.g. for transportation of people, comprising plates (10) supported by wheels, which are guided for movement at an upper level to form the loaded part of the moving ramp, and at a lower level which is substantially parallel with the upper level, to form the returning part of the moving ramp, adjacent plates in each part being close to each other. Stationary guides (16, 17) are provided as upper and lower runway tracks for the wheeled plates. The plates at the edges thereof are pivotally connected to endless chains (14) at one end of the plates the chains extending along the parts to be driven in one direction in the upper part and in the opposite direction in the lower part, a sprocket wheel (15) being provided for each chain (14) at each end thereof defining the distance between the parts. The other end of the plates is free for angular adjustment. For lowering and raising, respectively, the plates by engagement with the end of the plates which can be freely adjusted angularly, a rotating element (20, 22) driven synchronously with the sprocket wheel is provided at each end of the moving ramp. A number of drive stations for the endless chains are distributed along the length of the chains at least in the upper part thereof.

4 Claims, 4 Drawing Sheets

MOVING RAMP

BACKGROUND OF THE INVENTION

The invention relates to a moving ramp intended e.g. for transportation of people, comprising plates supported by wheels, which are guided for movement at an upper level to form the loaded part of the moving ramp, and at a lower level which is substantially parallel with the upper level, to form the returning part of the moving ramp adjacent plates in each part being close to each other, wherein stationary guides are provided as upper and lower runway tracks for the wheeled plates, the plates at the edges thereof are pivotally connected to endless chains at one end of the plates said chains extending along the parts to be driven in one direction in the upper part and in the opposite direction in the lower part, the other end of the plates being free for angular adjustment in cooperation with guides at the ends of the moving ramp to lower and raise, respectively, the plates by vertical displacement thereof in a substantially horizontal position one at the time from one part to the other.

U.S. Pat. No. 3,447,666 describes a moving ramp of this kind wherein the chains move in a substantially rectangular path, turning sprockets being provided at the four corners of the rectangle, and wherein a transition portion of each chain between the upper part and the lower part being utilized to transfer the end of the plates which is connected to the chain, from the upper part to the lower part, and vice versa. For the transfer of the free end of the plates there is provided at each end of the moving ramp endless auxiliary chains which are also guided in a rectangular path over turning sprockets in the four corners of the rectangle, vertical transfer portions being provided in parallel with the transition portions to take care of the free end of the plates and transfer this end from the upper part to the lower part, and vice versa, the plates being guided for parallel movement.

In another prior art moving ramp according to U.S. Pat. No. 2,893,538 wherein no endless chains are provided and wherein the plates are guided on upper and lower guide rails in the supporting and returning part, respectively, the plates are driven by means of gear wheels engaging racks on the plates in the upper part as well as the lower part. The plates are transferred between the parts at the two ends of the moving ramp by means of synchronously driven arms engaging the plates at the two ends thereof to transfer the plates by a parallel movement between the parts.

These prior art devices necessitate a large construction height in order that means provided for the transfer of the plates from one part to the other at the ends of the endless chains and for advancing the plates in the upper and lower parts will function in a satisfactory way.

If it is necessary to have the loaded part located substantially at the level of the supporting floor structure a substantial space must be provided below the loaded part to receive the returning part and the driving machinery, which means that the floor structure must form a "ditch" providing the necessary space.

SUMMARY OF THE INVENTION

The purpose of the invention is to provide a moving ramp of the kind referred to above which allows an extremely small construction height which may be less than 150 mm so that no modification at all of the supporting floor structure is necessary and the moving ramp does not interfere with existing space below the floor structure due to the fact that the moving ramp can be disposed directly on the floor structure. By this arrangement the further advantage is achieved that the moving ramp can easily be relocated should this be necessary when the room or other premises where the moving ramp is located have to be remodeled.

The said purpose is achieved by the moving ramp of the kind referred to above having obtained the characterizing features of claim 1.

BRIEF DESCRIPTION OF THE DRAWING

Embodiments of the invention will be described in more detail below reference being made to the accompanying drawings in which.

DETAILED DESCRIPTION OF THE PREFERRED EMBODIMENT

Figure 1:
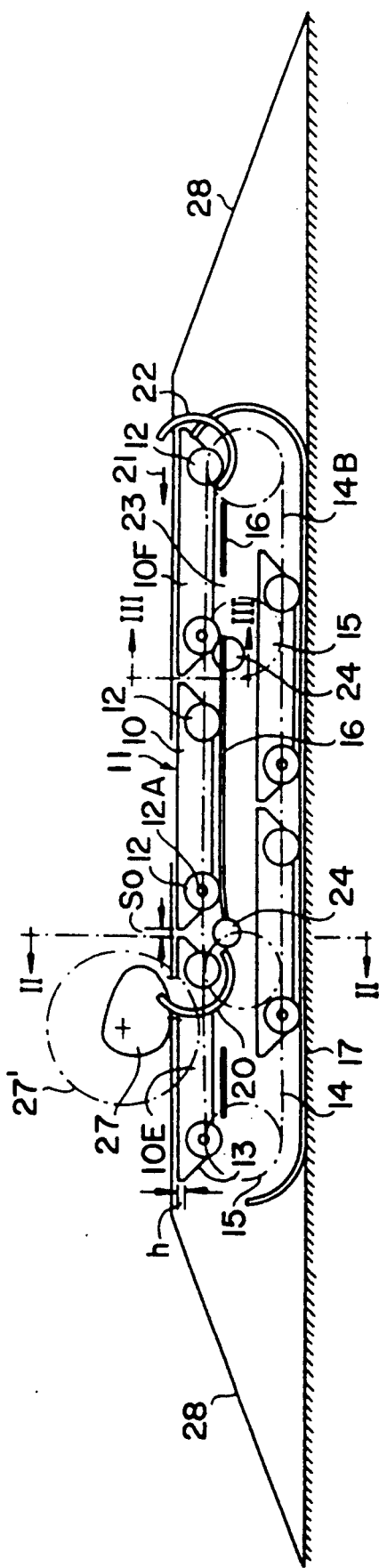
FIG. 1 is a diagrammatic side view of an embodiment of the moving ramp according to the invention.
Figure 2:
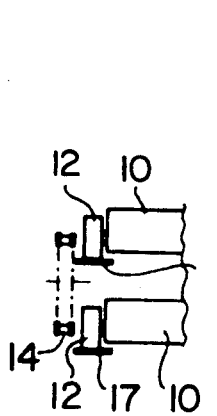
FIG. 2 is a fragmentary cross-sectional view along line II—II in FIG. 1.
Figure 3:
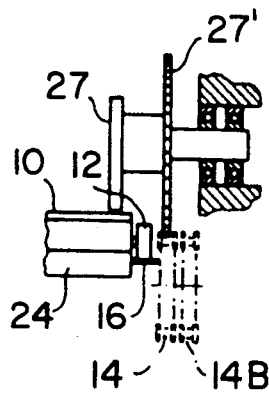
FIG. 3 is a fragmentary cross-sectional view along line III—III in FIG. 1.
Figure 4:
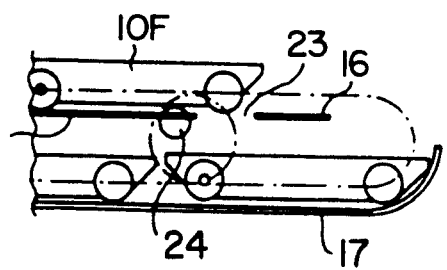
FIG. 4 is a fragmentary view similar to FIG. 1 showing the moving ramp in another functional position.
Figure 5:
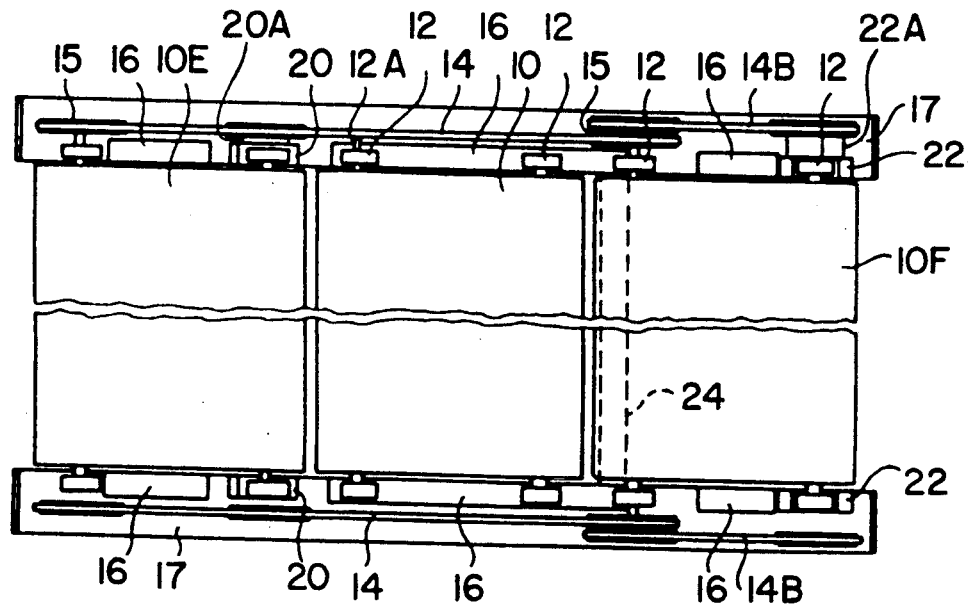
FIG. 5 is a plan view of the embodiment in FIG. 1.

The moving ramp comprises a number of plates 10 the upper side 11 of which forms the surface for carrying goods or people to be transported on the moving ramp. Each plate has two wheels 12 rotatably mounted to the plate, whereby the wheel pairs utilize the same wheel track. At each end the plate is beveled at the lower side thereof to form an inclined surface 13. Each plate is connected at the edges thereof at the shaft 12A of one wheel pair only to two endless drive chains 14 running over turning wheels 15 indicated diagrammatically only herein. The wheels are mounted in stationary bearing means. Two upper stationary supporting rails 16 extend in parallel with each other and with the upper parts of the endless chains mutually spaced horizontally a distance adjusted to the wheel track of the wheel pairs. In the same way two lower support rails 17 are provided along the lower parts of the endless chains in parallel with the upper support rails.

At the left end of the moving ramp two rotatable guides 20 are provided on a common drive shaft which —in case of drive chains driven to move the upper part of the moving ramp from the right to the left according to the arrow 21—are driven in counter-clockwise direction by means of the drive chains 14 via drive linkage 20A. Said guides are shaped, located and position synchronized such that they Can engage without jamming the trailing free wheel pair of the plate 10E which occasionally is being carried around the turning wheels 15 at the left end of the moving ramp at the leading wheel pair thereof so that the trailing end of the plate as a consequence thereof will be positively guided while moving from the upper part to the lower part where the guides will again disengage the wheels.

At the right-hand end of the moving ramp corresponding rotating guides 22 are provided which are shaped in a corresponding manner as the guides 20 to receive the wheels at the free end of the plate. They are driven synchronously with the drive chains in counter-clockwise, direction by means of auxiliary chains 14B via drive linkage 22A to engage the plate at the right-hand free end thereof and raise the plate when it shall be transferred from the lower part to the upper part of the moving ramp so that the plate also at the right-hand end thereof will be positively guided during this movement.

In the upper support rails gaps 23 must be provided to allow the movement of the wheel pair connected to the drive chains, upwards onto and downwards from, respectively, the upper support rails. In order that the wheels at the trailing end of the plate at the right-hand end of the moving ramp and the leading end of the plate at the left-hand end of the moving ramp can pass over this gap when the plates are moving to the left in the upper part of the moving ramp a rotatably mounted support roller 24 is provided to support the plate by engaging the lower side thereof when the plates are passing over the gaps 23 so that the plates are prevented from falling down into the gaps.

Figure 6:
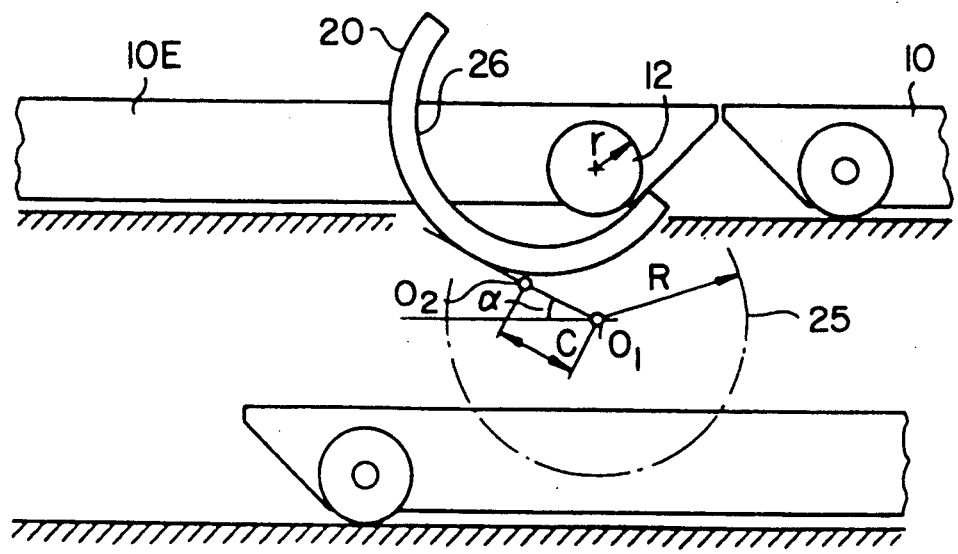
FIG. 6 is an enlarged fragmentary side view of the rotating guide element at the left-hand end of the moving ramp.

FIG. 6 discloses in more detail how the guide 20 should be constructed. The path to be described by the center of the wheel 12 on the plate 10E at the transfer from the upper part to the lower part of the moving ramp is a circle 25 having the center $O_1$. However, the guide 20 should rotate about a center $O_2$ which is displaced to the left upwards, the angle $\alpha$ and the distance c being related to the radius r of the wheel 12 and the radius R of the path 25 according to the relationship $$c > R \sin \alpha$$

and $$c < \frac{2(R - r)}{1 + \sin \alpha}$$

wherein $\alpha > 0$ and $\alpha$ preferably is great because lower normal forces in the mechanism are obtained as a consequence thereof. The guide surface 26 of the guide 20 should be semicircular and it can be arranged to engage the wheel 12 proper but it can also be arranged to engage a specific engagement wheel provided on the wheel shaft, such as a ball bearing, having a smaller diameter than the wheel, and in that case it is of course the radius of this specific guide wheel which is the radius r in the above relationship.

Figure 7:
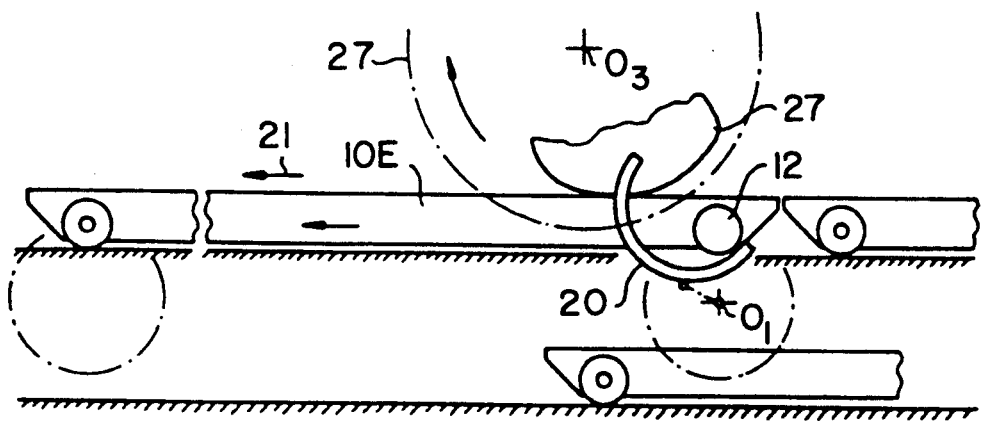
FIG. 7 is a view corresponding to FIG. 6 and shows a press-down element cooperating with the plate.

When the moving ramp is driven at high speed the mass forces will have such influence on the plates that these will disengage the guide 20. In order to eliminate this disadvantage a press-down cam 27 is provided, FIGS. 1 and 7, located on a wheel 27' the circumference of which should be as large as the pitch of the plates. This means that the press-down wheel will rotate one revolution for each plate. The press-down wheel rotates in clockwise direction about the center $O_3$. However, the plate must be dressed down during about 1/6 only of a revolution of the press-down wheel from the moment when the guide 20 has just engaged the wheel of the trailing end of the plate. The contour of the press-down cam should be shaped in view hereof. The wheel should not unnecessarily engage the plate because in that case the wheel may interfere with the guide 20. Preferably, the press-down cam is coated with a soft material (rubber or polyurethane).

The guide 22 at the right-hand end of the moving ramp can be shaped in a similar manner as shown in FIG. 6 but in this case it is not necessary to provide a press-down cam because the wheel 12 is guided by the guide rail 17.

At the ends of the moving ramp where the procedure of transferring the plates from one part to the other takes place the moving ramp should be covered by an approach ramp 28 on which goods or persons pass onto and out from the upper load carrying part of the moving ramp.

Due to the manner in which the plates are connected to the drive chains and are guided for transfer from one part to the other of the moving ramp the distance between the parts can be kept very small so that an extremely low construction height can be imparted to the moving ramp said height being below about 150 mm. This means that the moving ramp can be disposed on a supporting basement having flat upper side, and accordingly it is not necessary to have this basement shaped in a specific manner to provide space for the drive and turning machinery and for the returning lower part of the moving ramp. By this location of the moving ramp it is also possible that the ramp can be relocated in a simple manner from one place to the other.

It is not necessary that the moving ramp extends horizontally; it can also be inclined from one end to the other up to 10° to 12°.

As will be easily realized the rotating guides 20 and 22 and the support rollers 24 will function in the same manner as described above but reversely in case the drive direction of the moving ramp is reversed so that the upper part of the moving ramp is driven in a direction opposite to the arrow 21.

Figure 8:
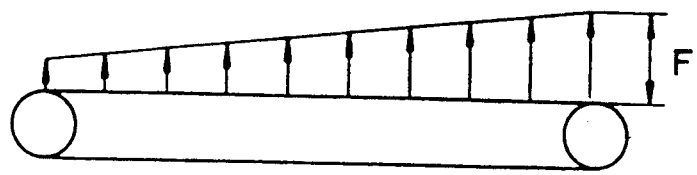
FIG. 8 is a diagram showing the force distribution in a chain at normal operation.

If the moving ramp is driven by the sprocket wheels at one end of the moving ramp being connected to a drive motor the force distribution in the upper part of the chains, which drives the plate in the upper loaded part of the moving ramp will be obtained as shown in FIG. 8 wherein the greatest stress is designated F and will be obtained at the driven sprocket wheel, the right-hand wheel in FIG. 8. This stress can be considerable and necessitates heavy drive chains to be provided. Such chains have a large pitch and require large sprocket wheels because the number of teeth of the sprocket wheels cannot be lower than a predetermined minimum number of teeth due to the so called polygon effect and poor engagement between the chain and the sprocket wheel. However, large sprocket wheels require a great construction height of the moving ramp which is contrary to the purpose of the invention.

In order to overcome this drawback several drive stations therefore are provided along the upper part of the drive chain said stations being distributed along said part and each comprising for example an electric motor, a gear and a sprocket wheel. For very long moving ramps it may be necessary to provide corresponding drive stations also for the lower part of the drive chains. This embodiment is shown diagrammatically in FIG. 9 wherein also the stress distribution in the chain is illustrated. If n drive stations are provided there will be obtained at a load corresponding to that in FIG. 8 a maximum stress in the chain, which is about F/n. In this way the dimensioning of the drive chains will be independent of the length of the moving ramp and it is possible to maintain a weak chain and thus small turning wheels for all lengths of the moving ramp.

Figure 9:
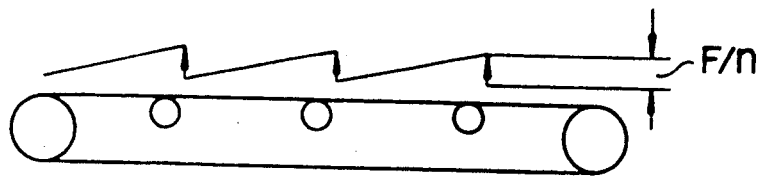
FIG. 9 is a corresponding diagram showing the force distribution in the chain in the novel drive wheel arrangement.
Figure 10:
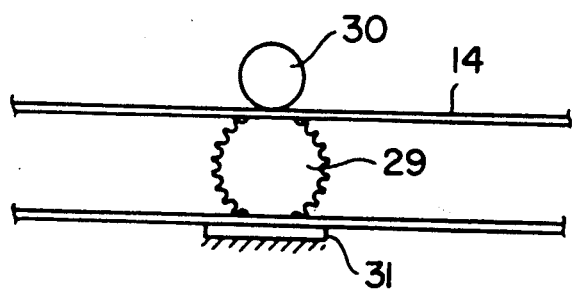
FIG. 10 is a diagrammatic side view of a drive wheel device when the chain is driven according to FIG. 9.

An embodiment of a drive station for the arrangement according to FIG. 9 is shown in FIG. 10. A larger chain sprocket 29 is drivingly engaging the upper part as well as the lower part of the drive chain 14 and shall be connected over a gear to an electric drive motor. The upper part is kept in engagement with the sprocket wheel by means of a holding-on wheel 30 while a slide bearing 31 can provide the necessary holding-on of the lower part.

In the same way as a distribution of the stresses in the drive chains is obtained in an arrangement having several drive stations as described above, the acceleration and breaking forces will be distributed over the length of the drive chains.

The drive stations can be made rather small so that they can be built into the balustrades commonly arranged one at each side of the moving ramp.

At the ends of the moving ramp the plates when being transferred from one part to the other will move against each other due to the fact that the end connected to the chains will describe a circular movement (with the radius R). If the ends were straight a large initial spacing between the plates would be necessary which is unsuitable from the security point of view considering the risk of people being caught. By this plates being beveled at 13, FIG. 1, the initial spacing between the plates can be reduced considerably. If the spacing is designated $S_0$ and the height of adjacent surfaces of the plates is designated h the following relationship can be established:

$$S_0 >= R * [\arccos(1 - h/(2*R)) - \sqrt{1 - (1 - (1 - h/(2*R))^2}]$$

If R=32 mm and h=32 mm there will be obtained $S_0 \geq 6$ mm while in the case of h being instead 10 mm (beveled plate) $S_0 \geq 1$ mm.

In a known manner the plates can form interengaging teeth or fingers at the ends thereof.

I claim:

1. Moving ramp comprising plates, wheels on said plates supporting the plates, stationary guides forming upper and lower runway tracks for the wheeled plates, guiding said plates for movement at an upper level to form the loaded part of the moving ramp, and at a lower level which is substantially parallel with the upper level, to form the returning part of the moving ramp, adjacent plates in each part being closed to each other, endless chains extending along said parts, the plates at the edges thereof being pivotally connected to the endless chains at one end of the plates, the other end of the plates being free for angular adjustment, a sprocket wheel for each chain at each end thereof, a rotating element forming a guide for lowering and raising, respectively, said other end of the plates along a circular path of movement, for displacement of said plates in a substantially horizontal position one at the time from one part to the other, means for driving said rotating element synchronously with the sprocket wheel, the rotation center of each of the rotating elements being displaced obliquely upwards toward the adjacent end of the moving ramp in relation to the center of the circular path of movement of said other end of the plates, and a plurality of drive stations for the endless chains for driving the chains.

2. Moving ramp as in claim 1 wherein the upper runway track forms a gap to allow the passage of the wheels through the tracks at the end of the plate connected to the endless chains.

3. Moving ramp as in claim 2 wherein means are provided for supporting the plates by engaging the lower side thereof at the movement of the plate over the gap.

4. Moving ramp as in claim 1 wherein the displacement (C) of the center of the rotating element at an angle ($\alpha$) to the horizontal plane is defined by the relationships $$c > R \sin \alpha$$

and $$c < \frac{2(R) - r}{1 + \sin \alpha}$$

wherein R is the radius of said circular path of movement, and r is the radius of the wheels of said plates.

* * * * *